June 14, 1932.  J. A. MAYNARD  1,863,227

RELIEF VALVE FITTING

Filed Aug. 3, 1926

INVENTOR=
Joseph Adolphus Maynard,
By Macleod, Calver, Copeland & Dike,
ATTORNEYS=

Patented June 14, 1932

1,863,227

UNITED STATES PATENT OFFICE

JOSEPH A. MAYNARD, OF BOSTON, MASSACHUSETTS

RELIEF VALVE FITTING

Application filed August 3, 1926. Serial No. 126,881.

This invention relates to pipe fittings and couplings and more particularly to a fitting adapted for the convenient attachment of domestic boiler relief valves such, for example, as the combined pressure, temperature and vacuum safety relief valve described and claimed in my application for patent filed November 6th, 1924, Serial No. 748,081.

The invention has for its object to provide an improved fitting, which may be readily included in a pipe connection to a boiler, for supporting a boiler relief valve in convenient and compact position alongside and parrallel to said connection and in communication therewith, said fitting having provision whereby ready access may be had to said valve without removing the latter, and being especially adapted for use in connection with temperature relief valves having fusible elements in order to permit the convenient renewal of said elements.

Figure 1:
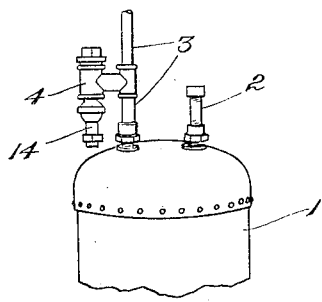
Figure 2:
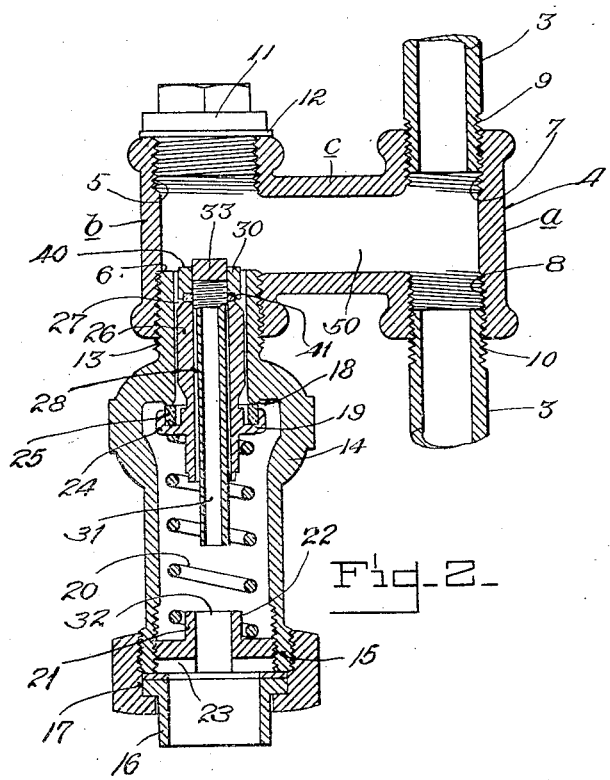

The foregoing and other objects of the invention, together with means whereby the latter may be carried into effect, will best be understood from the following description of one illustrative embodiment thereof shown in the accompanying drawing, in which:

Fig. 1 is a side elevation of a portion of a water boiler, showing my improved coupling attached thereto, and Fig. 2 is an enlarged sectional view of the coupling and attached relief valve.

Like characters of reference are used throughout the following specification and the accompanying drawing to designate corresponding parts.

A portion of a domestic water boiler 1 is shown in Fig. 1 of the drawing, and has the usual hot water boiler connection 2 and cold water supply pipe 3 at the top thereof. 4 denotes the fitting to which the invention particularly relates. This fitting, as shown most clearly in Fig. 2, comprises a hollow H-coupling having parallel side portions or branches $a$ and $b$ connected by a cross portion $c$. The ends of the side branches $a$ and $b$ are internally screw-threaded at 5 and 6, and 7 and 8. The cold water supply pipe 3 is broken, so that its adjacent threaded ends 9 and 10 may be fitted into the threaded sockets 7 and 8 of the branch $a$ of the H-coupling 4. A threaded plug 11 is removably positioned in the threaded socket 5, of the other branch $b$ of the H-coupling 4, and seats tightly on a packing washer 12, completely sealing the upper end of said branch. The lower internally screw-threaded end 6 of the last mentioned branch of the H-coupling 4 is adapted to receive a relief valve of the type disclosed and claimed in application Serial No. 748,081 above referred to.

This relief valve comprises a housing 14 having a threaded nipple 13 at one end to engage the threaded end 6 of the H-coupling 4, while the other end of the housing has a threaded nipple 15 to which is fitted a short open pipe 16 secured in place by the union 17. The passage through the housing 14 is reduced at the end adjacent the nipple 13 and where this reduced portion begins the barrel is rounded off to form the valve seat 18 for the pressure valve 19. This valve is yieldingly pressed to its seat with a predetermined variable pressure by a coil spring 20 resting on the concealed adjustment plug 21. The plug 21 screws into the end of the barrel 14 and receives the end of the coil spring 20 over a tubular extension 22 projecting from one side of said plug. By adjusting the plug 21, for which purpose the slot 23 is provided, the tension of the spring 20 can be varied so that the point at which the valve 19 will open to relieve excess pressure can be varied and set as required. The union 17 and the short pipe 16 conceal and protect the adjustment plug 21. The valve 19 is enlarged below the seat 18 of the casing 14 to provide a circular flange 24 which is cut away to receive a washer 25, which engages the valve seat 18. The neck 26 of the valve 19 extends into the reduced passage 27 of the housing, a limited amount of clearance being allowed between the interior of the nipple 13 and the neck 26. The passage 27 leads into the interior space or chamber 50 of the pipe connection. A central passage 28 extends through the entire length of the presser valve 19 which passage is controlled by a vacuum valve 30. The vacuum valve 30 consists of a tubular member 31 which extends through the central passage 28 of the valve 19 and into the interior of the housing 14. The upper end of the tubular member 31 is screwed into a head member 40. A washer 41 in the lower face of the head member 40 rests against the seat on the end of the neck 26 of the presser valve. The head 40 has a passage therethrough in line with the passage through the tubular member 31. This opening is normally closed by a fusible plug 33 which is made to fuse at a predetermined temperature. This plug extends into the chamber 50 and is exposed to the boiler temperature. When the temperature in the boiler becomes sufficiently high to fuse the plug 33, the passage through the head member 40 and the stem 31 is opened, thereby establishing a free passage through the valve 30 into the housing 14 through the port 32 in the plug 21 and the opening through the pipe 16.

It will be seen that the coupling or fitting 4 is particularly well adapted to connect a relief valve of the type shown to a vertically disposed boiler supply pipe 3 in that it supports said valve in its vertical operative position closely adjacent the pipe. Moreover, it will be noted that with the particular form of fitting herein employed the entire device is supported wholly within the area above the head of the boiler 1, thereby eliminating any unnecessary parts projecting beyond the side walls of the boiler. It will also be apparent that when it is desired to renew the fusible plug 33 it will only be necessary to unscrew and remove the threaded plug 11, whereupon ready access may be had to the inner end of the valve casing or housing, through the hollow branch $b$ of the H-coupling. This construction will thereby do away with the necessity of entirely removing the valve and its casing, every time a new fusible plug has to be installed.

Having thus described my invention, I claim:

1. A relief device for a pipe connection to a boiler comprising a double coupling having an intercommunicating passage between said coupling members, one of said members being adapted to fit into a pipe line without interfering with the flow of fluid therethrough, the other coupling member having a removable fusible valve, and a removable plug carried by said last named coupling member and closing an opening therein through which said valve is removable.

2. A relief valve having, in combination, a casing provided with an inner and an outer chamber with a fluid inlet entering the inner chamber and a fluid discharge outlet from the outer chamber, a movable valve member between said chambers adapted to be operated by excess pressure in said inner chamber to open a passage between said chambers, a fusible plug between said chambers adapted to melt at a predetermined temperature and thereby open a passage between said chambers, and a vacuum relief valve adapted to close a passage between said chambers, the said fusible plug being replaceable without interference with said movable valve member.

3. A relief device comprising a casing having an inlet and outlet, a pressure relief valve normally closing a passage in the casing between said inlet and outlet, a vacuum relief valve normally closing another passage in the casing between said inlet and outlet, a fusible temperature relief member normally closing a third passage between the inlet and outlet, and a removable plug closing an opening in the casing through which said fusible member is replaceable without interference with said pressure valve.

4. A relief device comprising a casing having an inlet and an outlet, a pressure relief valve normally closing a passage in the casing between said inlet and outlet, a tube provided with a vacuum valve closing another passage in the casing between said inlet and outlet, said tube forming a third passage therethrough between the inlet and outlet, a fusible temperature relief member normally closing said tube passage, and a removable plug closing an opening in the casing through which opening said tube is removable to replace the fusible member without interference with said pressure valve.

5. A relief device comprising a casing having an inlet and outlet, a pressure relief valve normally closing a passage in the casing between said inlet and outlet, a tube mounted in the casing and having a passage therethrough adapted to connect the inlet and outlet, a fusible element normally closing the tube passage, and a removable plug carried by the casing opposite an end of the tube and normally closing an opening in the casing separate from said inlet and outlet and through which opening said tube is removable without interference with said pressure relief valve.

In testimony whereof I affix my signature.

JOSEPH A. MAYNARD.